Sept. 27, 1932.  C. MACBETH  1,879,379
VULCANIZER
Filed Dec. 16, 1929   3 Sheets-Sheet 1
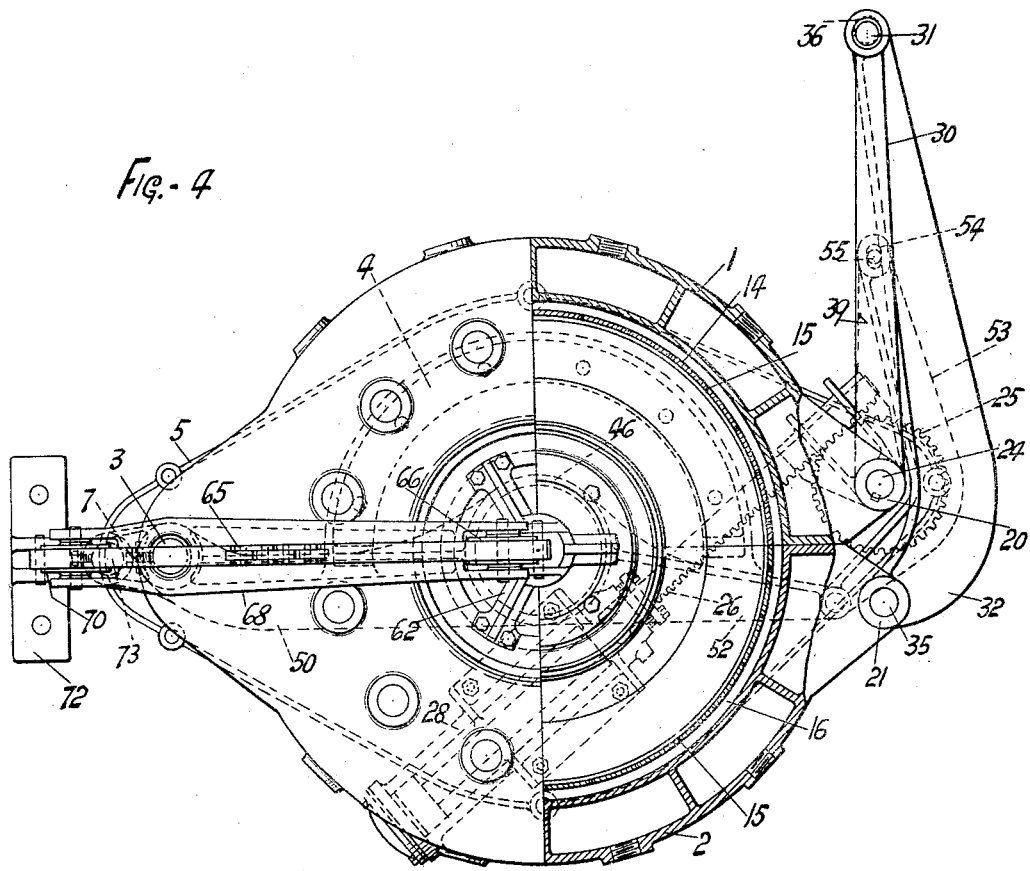
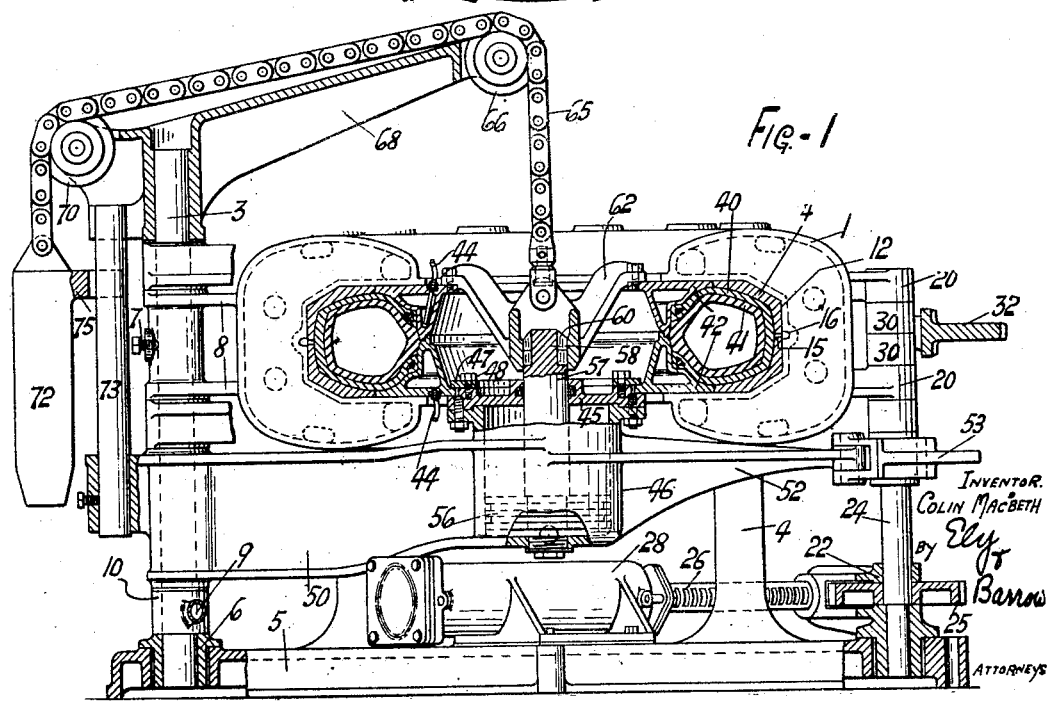

Sept. 27, 1932.  C. MACBETH  1,879,379

VULCANIZER

Filed Dec. 16, 1929  3 Sheets-Sheet 2

INVENTOR
COLIN MACBETH

BY Ely Barrow

ATTORNEYS

Sept. 27, 1932. C. MACBETH 1,879,379
VULCANIZER
Filed Dec. 16, 1929 3 Sheets-Sheet 3

INVENTOR
COLIN MACBETH

BY Ely & Barrow

ATTORNEYS

Patented Sept. 27, 1932

1,879,379

UNITED STATES PATENT OFFICE

COLIN MACBETH, OF FOUR OAKS, ENGLAND

VULCANIZER

Application filed December 16, 1929, Serial No. 414,321, and in Great Britain November 14, 1929.

The present invention relates to the vulcanization of vehicle tires and particularly to pneumatic tires which are vulcanized or cured upon air bags in heated or jacketed molds.

It is one of the objects of the invention to construct a vulcanizer for this purpose which is of the individual cavity type, in which the vulcanizer may be quickly opened and closed. It is a further object of the invention to construct a vulcanizer of this type in which the operation of the vulcanizer will be entirely automatic.

It is a further object of the invention to combine, with a vulcanizer of this type, means for applying the bead rings or clip rings to the tire and pressing them into position prior to the placing of the tire in the vulcanizer. So far as is known to me, the within described invention is the first to combine bead ring applying and pressing mechanism, with a vulcanizer.

It is also an object of the invention to provide a movable stand or support for the tire which, when the vulcanizer is opened, will move the tire to an intermediate position between the halves or sections of the vulcanizer, whereby the tire is stripped from the mold and moved to a position in which it is clear of the mold and easy access may be had for the purpose of removing the vulcanized tire and replacing it with an unvulcanized tire.

There are other objects and advantages to be accomplished, as will be apparent to those familiar with, or skilled in this art—it being the intention to point to many of these objects and advantages in the description of the invention. It is not intended that the invention be limited to the exact form or relationship of the several parts as shown and described, as changes, modifications and improvements thereon that may be made within the scope of the invention as set forth in the claims.

The invention is similar in many respects to that shown and described in my co-pending application, Serial No. 232,747, filed November 12th, 1927.

In the drawings in which the preferred, or best-known, form of the invention is illustrated—

Figure 1 is a side elevation of the vulcanizer in closed position, portions thereof being shown in section.

Figure 4 is a plan view of the vulcanizer in closed position.

Figure 2:
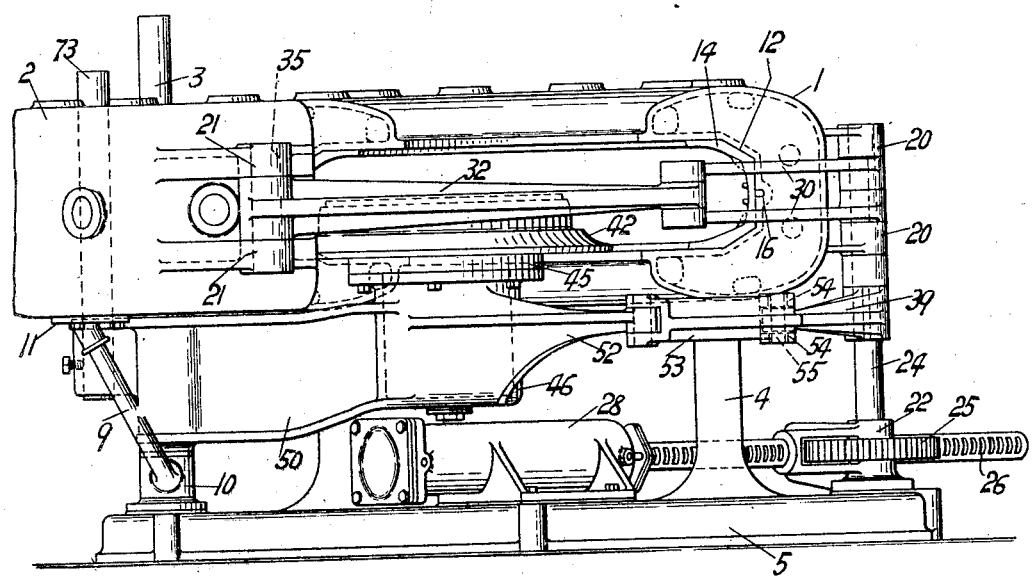
Figure 2 is a side elevation showing the vulcanizer in its open position.
Figure 5:
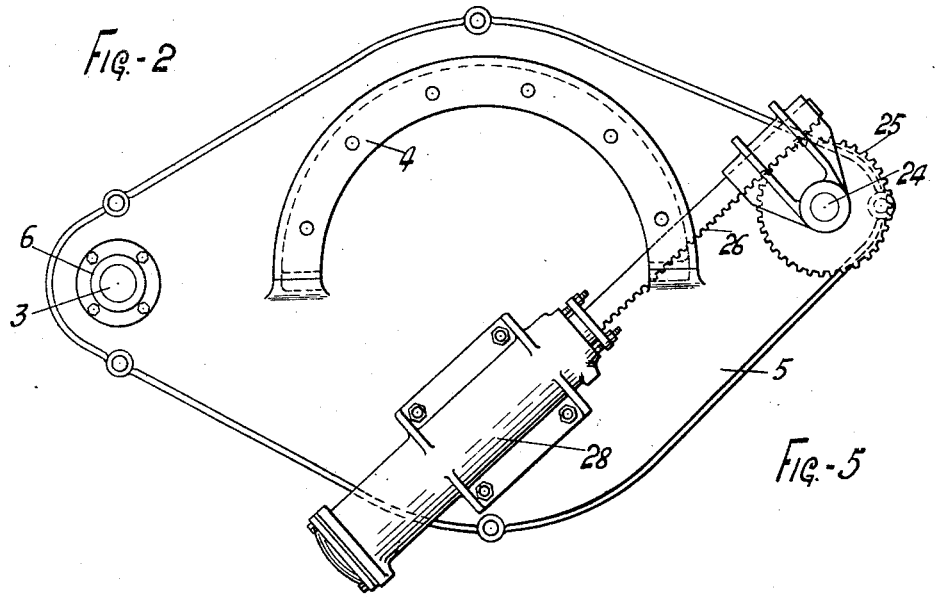
Figure 5 is a plan view taken beneath the mold showing the operating mechanism.
Figure 6:
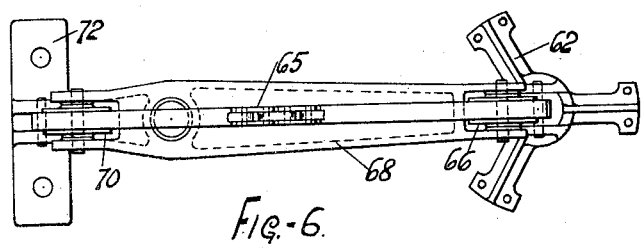
Figure 6 is a plan view of the bead ring supporting arm.

It will be understood that while the invention is described in considerable detail, embodiments of the invention may be altered and varied in accordance with special requirements or conditions. Primarily, the invention is intended for the vulcanization of automobile tires, but it is not necessarily so limited.

The vulcanizer comprises a two-part mold which is divided into two equal halves or sections, here indicated by the numerals 1 and 2. The mold is preferably arranged in a horizontal plane and the two sections are connected by a vertical hinge pin 3, which passes through lugs or ears on the sections. These mold sections may be arranged to open and close as found practicable, but for the present purposes one of the sections, here illustrated as the section 1, is stationary while the other section is pivoted.

For supporting the stationary section, a semicircular or curved land 4 or support may be provided upon the base 5. The vertical hinge pin 3 is mounted at its lower end in a sleeve or bushing 6 in the base 5 and at its upper end is secured in the stationary mold section by a set screw 7. The movable mold section rocks about the pin 3 on the two lugs or ears 8 and is supported at its outer end by the diagonal brace 9. This brace is carried at its inner end upon a sleeve 10 on the pin 3, and at its outer end is attached near the outer side of the mold by the plate 11.

It will be observed that each of the vulcanizer sections is hollow or chambered for the circulation of steam and surrounds the tire cavity except upon its inner circumference. The sections are formed with the seats or cavities 12, in which are received shells 14 which constitute the outer half of the tire mold, being provided with the requisite non-skid pattern. In order to permit the escape of the rubber during vulcanization, the shell is provided with the radial passages 15 which discharge into a larger overflow cavity 16 formed around the vulcanizer section. In the operation of the machine, the rubber which is spewed out into the cavity may be removed from time to time by passing the end of a bar around the cavity, the shell being removed for that purpose if required.

It will be observed that each shell 14 extends inwardly to points in each side of the tire cavity at or adjacent to the widest portion of the tire, this being preferred in order that the tire may be easily removed from the tire cavity. The inner edges of the shell are radial, or approximately radial, with respect to the tire cavity so that thin or feather edges in the metal are avoided. The shells are held in position within the vulcanizer section by any suitable means which is not illustrated.

As described in the earlier part of the specification, the section 1 is stationary and the section 2 moves toward and away therefrom about the vertical hinge pin. Means are provided for moving the section 2 and locking it in closed position. On the end of the section 1, remote from the hinge, are formed the ears or lugs 20, and opposite thereto in the section 2 are the lugs 21. Mounted in the lugs 20 and in the step bearing 22 on the base is the vertical shaft 24, on the lower end of which is the pinion 25. This pinion meshes with a sliding rack 26 operated by the piston in a double-acting cylinder 28. This cylinder is provided with connections for hydraulic or air operation, so that it may be power-operated in either direction to rotate the actuating shaft 24 and thereby unlock and open or close and lock the vulcanizer.

To the upper end of the shaft 24 between the lugs 20, are keyed the two parallel links 30 which, when the rack is withdrawn and the vulcanizer closed and locked, are at the extreme position shown in Figure 4. On the outer end of the links 30 is located the pin 31 on which is mounted the link 32, which is somewhat longer than the links 30, is curved at its outer end to clear the lugs 20 and is attached to the lugs 21 on the movable section by the vertical pin 35. When the mold is closed, the links 30 and 32 have approached parallelism and the points 24, 31 and 35 are in alignment so that at the closing of the mold a powerful squeezing action is obtained which forces the two halves of the mold together in tight abutting relationship. The pin 31 may have a slight eccentric boss in either of the links as shown at 36, so that the mechanism can be adjusted to compensate for wear and secure perfect clamping action.

Figure 3:
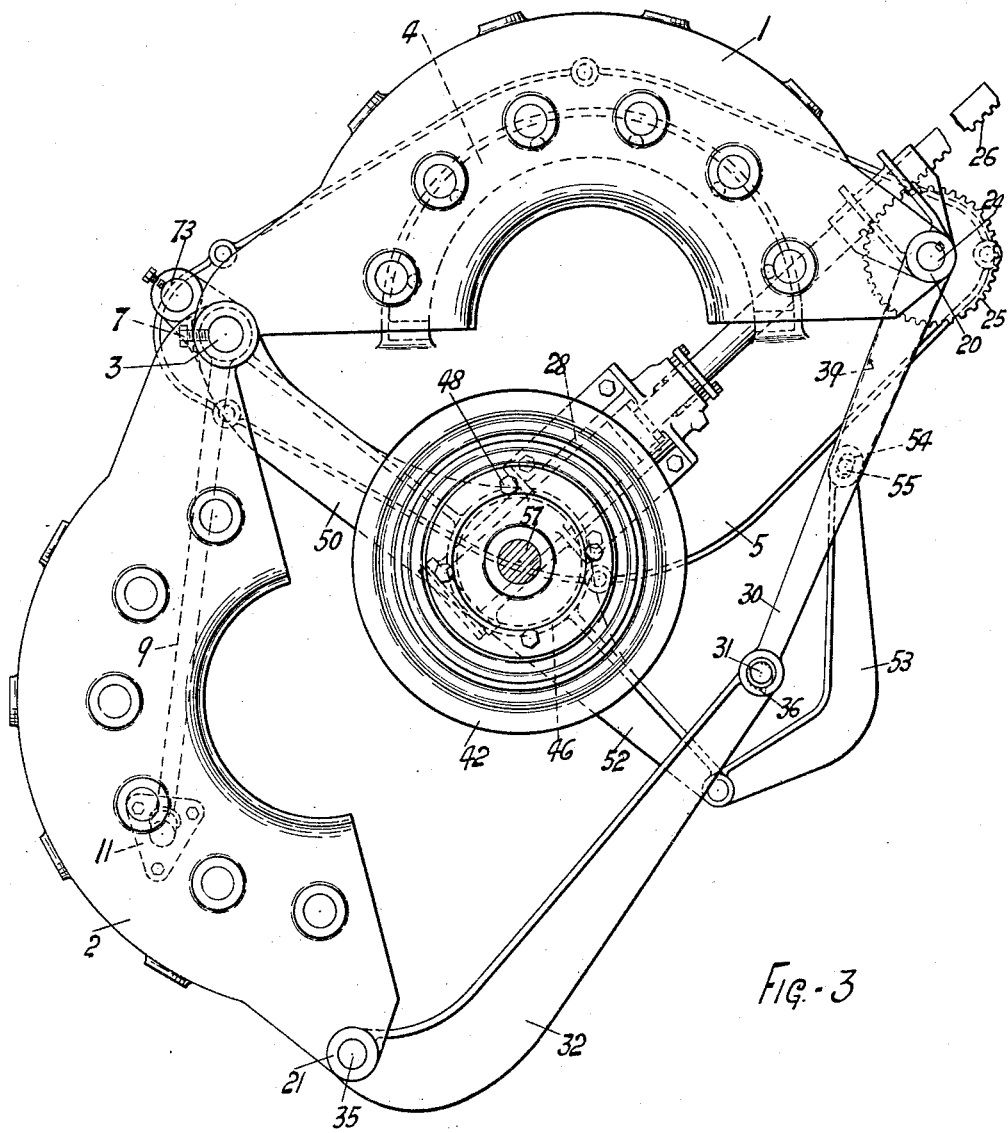
Figure 3 is a plan view of the vulcanizer in open position, certain parts of the bead ring mechanism being omitted for the sake of clearness.
Figure 7:
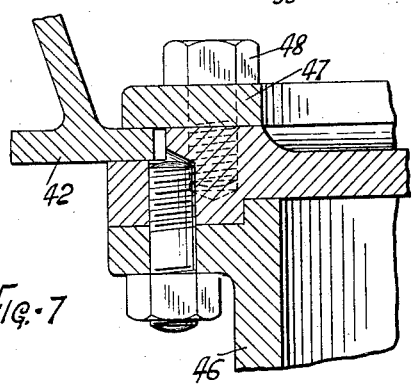
Figure 7 is an enlarged sectional detailed view at the top of the clip ring or bead ring supporting table.

When the rack is advanced as shown in Figure 3, the link 30 is swung around through approximately 180° which moves the link 32 into position substantially in alignment therewith, thereby opening the vulcanizer and moving the section 2 to a distance equal to the combined lengths of the two links. By the mechanism which has been described, the vulcanizer is given a very full opening and closing movement, automatically and effectively.

The tire, which is indicated by the numeral 40, is cured upon an air bag 41 and is mounted between the two bead rings or clip rings 42. When the tire is assembled in the vulcanizer, the outer edges of the bead rings rest against and fit snugly into the inner edges of the shells 14 so as to complete the molding cavity. The bead rings are chambered so as to secure a circulation of steam through the rings and thereby adequately vulcanize the beads, and the lower sidewalls of the tire. The steam may be admitted to the rings through any suitable connections and the condensate removed through the pipes 44. The outer surfaces of the bead rings may be parallel or they may have a slight draft, but in either case the closing of the vulcanizer about the bead rings will force the several parts of the mold into tight fitting relationship.

In order to remove the vulcanized tire and replace it with unvulcanized tire, it is necessary that the bead rings be moved to a position removed from the tire mold halves when the vulcanizer is opened, in which operation the bead rings move in their own plane to a position laterally of the axis of the vulcanizer. It is also one of the functions of the apparatus to apply the bead rings with the usual mechanism necessary for what is known in the art as the "rimming up" operation.

The lower bead ring 42 is attached to the apparatus, being mounted on the cover 45 of a movable cylinder 46 by means of a clamp ring 47, held in position by bolts 48. The cylinder 46 is located on the axis of the tire when the latter is positioned in the bead rings, and is carried on a swinging arm 50 which is beneath the vulcanizer and is pivoted on the vertical pin 3. In order to move the swinging arm to its alternative position, it is provided with the extension 52, to the outer end of which is pivoted the curved link 53. The other end of the link is provided with a slot 54 which is received over a pin 55 on a lever 39 attached to the vertical shaft 24 and movable therewith. As the link 30 is actuated to open and close the mold, the link 39 and the connecting line 52 will move the arm 50 and its cylinder and bead ring to the alternative position in which the tire can be manipulated free of the mold. The slot 54 permits a slight dwell or lag just as the vulcanizer is closing and opening.

The cylinder 46 contains the double-acting piston 56, the rod 57 of which extends through the centre of the lower ring 42 and is provided at its upper end with a head 58 having vertical slots 60 at equally spaced points thereabout. A removable spider 62 having lugs thereon which pass through the slots is adapted to be placed over the head and then rotated to locked position. The arms of the spider are adapted to project out over the upper surface of the upper bead ring to which they are attached. It will be seen that with the parts assembled as shown and described, admission of pressure to the upper side of the piston 56 will, through the spider, exert a powerful squeezing action on the bead rings. When the piston is moved upwardly, the upper bead ring is lifted with the spider and thereby stripped from the tire. To place or remove the tire it is necessary to separate the spider from the piston rod, which may be done by turning the former until it is removable through the slots in the head.

To support the spider and upper bead ring, a chain or cable 65 is attached to the spider and passes over a pulley 66 on the end of the arm 68 which is rotatable on the hinge pin 3. The other end of the cable passes over a pulley 70 located on the inner end of the arm and to it is attached the balance weight 72. A pin 73 is connected to extension from the arms 50 and 68 respectively, so that these arms move in unison and the weight may have a fork 75 thereon by which the weight is guided in its vertical movement.

It is believed that the operation of the apparatus will be readily understood from the description which has been given. When the vulcanizer is open, and the upper bead ring and its attached mechanism raised, a tire with its air bag is placed on the lower bead ring and the upper bead ring lowered and connected to the piston 56. The piston is then drawn down, clamping the tire securely between the bead rings. The connection for the air bag may then be made and the closing mechanism operated which, through the toggle links, moves the tire and bead rings into the mold sections, which are then clamped together tightly by the action of the toggle mechanism, whereupon the pressure is admitted to the air bag and the tire vulcanized. After curing, the operations are reversed and the vulcanized tire may be removed. The operation of the vulcanizer may be carried on so that the mold and bead rings are not allowed to cool.

The apparatus may be provided with any suitable timing mechanism to control automatically the admission of pressure to the air bag. As the mold and bead rings are heated, the tire is given a rapid and even vulcanization throughout. If desired, the mechanical connection for operating the toggle links may be omitted. Also, safety locks may be employed to supplement the toggle links; but this is believed to be unnecessary.

The apparatus may be improved or modified without in any manner losing the benefits and advantages of the invention, and it is not the intention that the claims should be limited to the exact features shown and described herein. It will be also understood that the term "tire" as used herein, may also include the tube where such substitution is practicable.

What is claimed is:

1. A vulcanizer having two sections, means to cause the sections to open and close, a support for a tire located at the axis of the vulcanizer in closed position, and means for moving said support with the opening of the sections to a position removed from the axis of the vulcanizer.

2. A vulcanizer having two sections hingedly connected together, means to cause the sections to open and close, a support for a tire located at the axis the vulcanizer in closed position, and means for moving said support with the opening of the sections to a position laterally of the axis of the vulcanizer.

3. A vulcanizer having two sections, one of which is stationary and the other hinged thereto, and a support for a tire pivotally mounted and operable to swing from a position at the axis of the vulcanizer when the sections are closed to a position laterally of said axis when the sections are opened.

4. A vulcanizer having two sections, one of which is stationary and the other of which is hinged thereto, a swinging support for the tire movable with the hinged sections but to a less degree, whereby the tire is stripped from the mold.

5. An apparatus as claimed in claim 3 in which the support for the tire is connected to a bead ring.

6. An apparatus as set forth in claim 4 in which the support for the tire is connected to a bead ring.

7. An apparatus for vulcanizing tires having a stationary and a swinging section, a swinging tire support movable with the swinging section, bead rings connected with the support, and means for exerting pressure upon the bead rings.

8. An apparatus as set forth in claim 7 in which the pressure exerting means is movable with the support.

9. An apparatus for tire vulcanizing having a stationary section and a movable section, a tire support movable parallel to the plane of the tire toward and away from the stationary section, bead rings movable with the support, means to force rings against the tire and separable connections between the bead rings.

10. In a tire vulcanizer the combination of two hinged sections, bead rings located between the sections and movable in their own planes relatively thereof, and means associated with the vulcanizer to force the bead rings into position against the base of the tire.

11. In a tire vulcanizer the combination of two sections hinged together, upper and lower, bead rings located within the sections, a piston and means to detachably connect the upper bead ring to the piston.

12. Apparatus as claimed in claim 11, in which there is provided a support for the upper bead ring.

13. A tire vulcanizer having two sections divided diametrically of the tire, a toggle mechanism for opening and closing and locking the section, a tire support and connections to the support to move it during the opening and closing of the sections.

14. An apparatus as claimed in claim 13 in which there is provided power mechanism for operating the toggle.

15. A tire vulcanizer having sections divided radially of the tire, means to open and close the sections, a tire support intermediate the sections and movable parallel to movement of the sections, bead rings carried by the support, and means on the support to force the bead rings against the tire.

16. A tire vulcanizer having sections divided radially of the tire, means to open the sections, a tire and bead ring support movable parallel to the movement of the sections, and means to force the bead rings against the side of the tire.

COLIN MACBETH.